United States Patent
Lepak et al.

(10) Patent No.: US 7,603,522 B1
(45) Date of Patent: Oct. 13, 2009

(54) BLOCKING AGGRESSIVE NEIGHBORS IN A CACHE SUBSYSTEM

(75) Inventors: Kevin M. Lepak, Austin, TX (US); Roger D. Isaac, Austin, TX (US)

(73) Assignee: Globalfoundries Inc., Grand Cayman (KY)

( * ) Notice: Subject to any disclaimer, the term of this patent is extended or adjusted under 35 U.S.C. 154(b) by 190 days.

(21) Appl. No.: 11/432,706

(22) Filed: May 10, 2006

(51) Int. Cl.
*G06F 12/00* (2006.01)

(52) U.S. Cl. .................................. 711/130; 711/133

(58) Field of Classification Search .................. None
See application file for complete search history.

(56) References Cited

U.S. PATENT DOCUMENTS

| | | | |
|---|---|---|---|
| 4,607,331 A | 8/1986 | Goodrich, Jr. et al. | |
| 5,224,217 A | 6/1993 | Zangenehpour | |
| 5,974,507 A | 10/1999 | Arimilli et al. | |
| 6,078,995 A | 6/2000 | Bewick et al. | |
| 6,161,167 A | 12/2000 | Witt | |
| 6,532,520 B1 * | 3/2003 | Dean et al. ................. | 711/133 |
| 6,823,427 B1 | 11/2004 | Sander et al. | |
| 2002/0062427 A1 * | 5/2002 | Chauvel et al. ............ | 711/151 |
| 2002/0073282 A1 * | 6/2002 | Chauvel et al. ............ | 711/122 |

OTHER PUBLICATIONS

"The effect of using state-based priority information in a shared-memory multiprocessor cache replacement policy". Mounes-Toussi an Lilja. Proceedings: 1998 International Conference on Parallel Processing. Aug. 10-14, 1998.*

Glass, Gideon and Cao, Pei, "Adaptive Page Replacement Based on Memory Reference Behavior", Sigmetrics 1997: Proceeding of the 1997 ACM Sigmetrics internation conference on measurements and modeling of computer systems, pp. 115-126.*

Liu, et al; "Organizing The Last Line Of Defense Before Hitting The Memory Wall for CMPs" High Performance Computer Architecture, 2004 HPCA-10 Proceedings. 10th International Symposium on Volume, Issue, Feb. 14-18, 2004 pp. 176-185.

* cited by examiner

*Primary Examiner*—Reginald G Bragdon
*Assistant Examiner*—Eric Loonan
(74) *Attorney, Agent, or Firm*—Rory D. Rankin; Meyertons Hood Kivlin Kowert & Goetzel, P.C

(57) ABSTRACT

A system and method for managing a cache subsystem. A system comprises a plurality of processing entities, a cache shared by the plurality of processing entities, and circuitry configured to manage allocations of data into the cache. Cache controller circuitry is configured to allocate data in the cache at a less favorable position in the replacement stack in response to determining a processing entity which corresponds to the allocated data has relatively poor cache behavior compared to other processing entities. The circuitry is configured to track a relative hit rate for each processing entity, such as a thread or processor core. A figure of merit may be determined for each processing entity which reflects how well a corresponding processing entity is behaving with respect to the cache. Processing entities which have a relatively low figure of merit may have their data allocated in the shared cache at a lower level in the cache replacement stack.

21 Claims, 6 Drawing Sheets

BLOCKING AGGRESSIVE NEIGHBORS IN A CACHE SUBSYSTEM

BACKGROUND OF THE INVENTION

1. Field of the Invention

This invention is related to computer systems and, more particularly, to memory management within computer systems.

2. Description of the Related Art

Typically, computer systems include one or more caches to reduce the latency of a processor's access to memory. Generally, a cache may store one or more blocks, each of which is a copy of data stored at a corresponding address in the memory system of the computer system. In cases where a system includes multiple processors, or processing cores, some caches may be exclusive to particular processors, while others are shared. As is well understood, shared levels of cache for multi-core processors and multi-threaded workloads are well-understood. However, for multi-programmed workloads, shared levels of cache can leave significant opportunity for optimization. Multiple programs (e.g., one running on each core) can interact micro-architecturally, although they have no real "relation" to one-another. Each of the programs may have very different requirements on execution resources, memory resources, etc. Consequently, the behavior of one program with respect to a shared cache may negatively impact the operation of another program.

For example, assuming a system includes a shared level three (L3) cache, one processor may be running a program with "bad" cache behavior (e.g., streaming through memory), while another processor on the same chip has "good" cache behavior (e.g., has a good L3 hit rate). The bad program can completely displace the good program's data from the L3 cache without deriving any benefit from the shared L3 space (since it is streaming).

In view of the above, a method and mechanism for detecting such scenarios and de-prioritizing the bad program's data in the L3 is desired. Accordingly, effective methods and mechanisms for managing a shared cache are desired.

SUMMARY OF THE INVENTION

A system and method for managing a cache subsystem are contemplated.

A system comprises a plurality of processing entities, a cache shared by the plurality of processing entities, and circuitry configured to manage allocations of data into the cache. Cache controller circuitry is configured to allocate data in the cache at a less favorable position in the replacement stack in response to determining a processing entity which corresponds to the allocated data has relatively poor cache behavior compared to other processing entities. The circuitry is configured to track a relative hit rate for each processing entity, such as a thread or processor core. A figure of merit may be determined for each processing entity which reflects how well a corresponding processing entity is behaving with respect to the cache. Processing entities which have a relatively low figure of merit may have their data allocated in the shared cache at a lower level in the cache replacement stack.

In one embodiment, the cache controller circuitry includes an interval counter which is used for determining an interval during which cache hits, misses, and/or accesses by processing entities will be counted. During a given interval, the control circuitry may detect an access to the cache by a given processing entity an increment an access count for the processing entity. If the access hits in the cache, a hit count may also be incremented for the entity. In response to detecting an allocation into the cache by a particular processing entity, the control circuitry accesses statistics maintained for the allocating entity and determines a figure of merit for the entity. The figure of merit may be a function of the hit rate of the processing entity to the cache. The circuitry may then compare the determined figure of merit to other processing entities figures of merit. If the allocating entity's figure of merit is relatively poor compared to the other figures of merit, the data may be allocated in the cache at a lower level in the cache replacement stack than would otherwise be the case.

These and other embodiments are contemplated and will be appreciated upon reference to the following description and figures.

BRIEF DESCRIPTION OF THE DRAWINGS

Other objects and advantages of the invention will become apparent upon reading the following detailed description and upon reference to the accompanying drawings in which.

Figure 1:
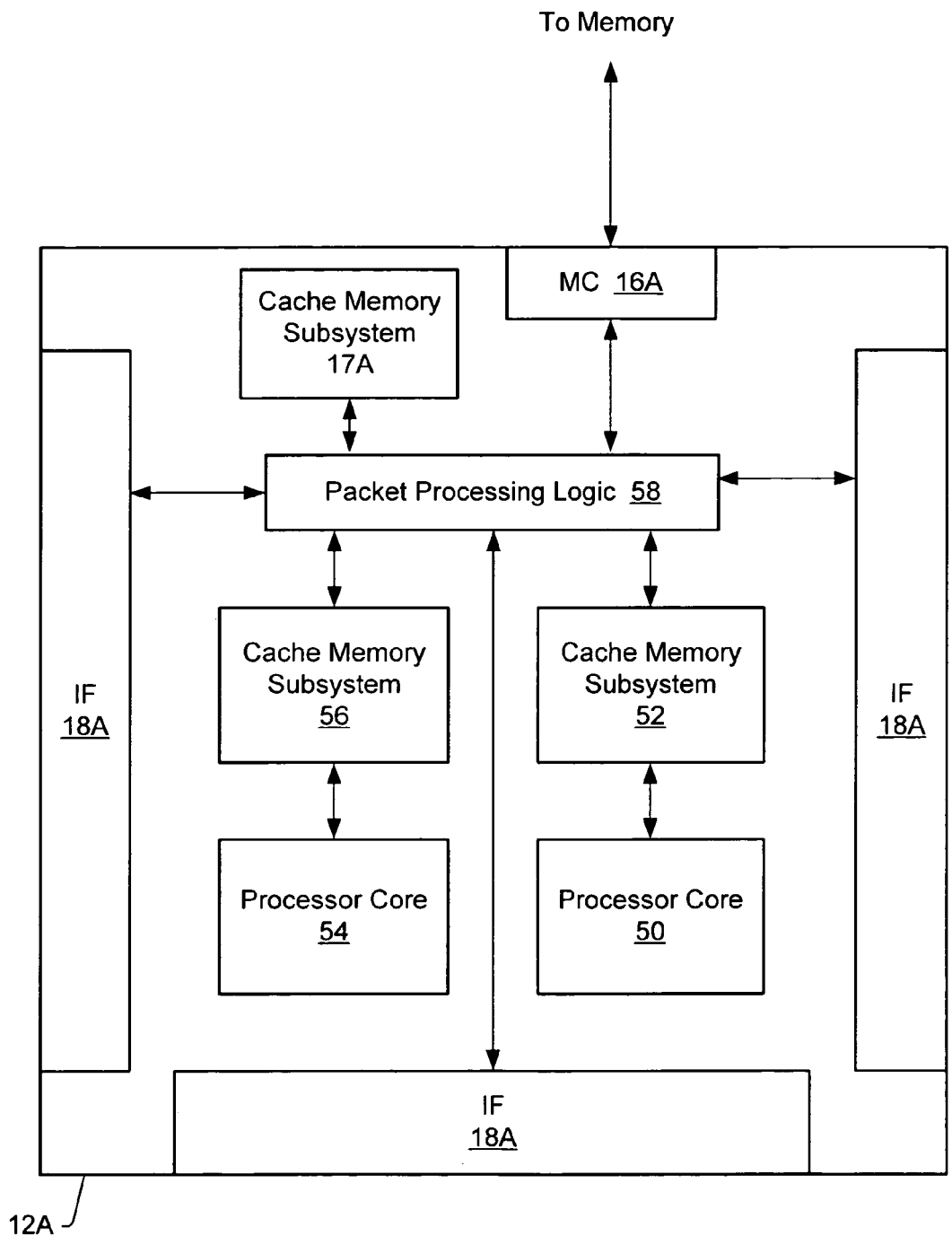
FIG. 1 is a block diagram of one embodiment of a processing node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 is a block diagram of one embodiment of a processing node 12A. Processing node 12A includes memory controller 16A, interface logic 18A, a processor core 50, a cache memory subsystem 52 and packet processing logic 58, and cache memory subsystem 17A. Processing node 12A may also include one or more additional processor cores 54 and cache memory subsystems 56, as desired. In one embodiment, the illustrated functionality of processing node 12A is incorporated upon a single integrated circuit.

Generally speaking, packet processing logic 58 is configured to respond to control packets received on the links to which processing node 12A is coupled, to generate control packets in response to processor cores 50 and 54 and/or cache memory subsystems 52 and 56, to generate probe commands and response packets in response to transactions selected by memory controller 16A for service, and to route packets for which node 12A is an intermediate node to other nodes through interface logic 18A. Interface logic 18A may include logic to receive packets and synchronize the packets to an internal clock used by packet processing logic 58.

Cache subsystems 17A, 52 and 56 comprise high speed cache memories configured to store blocks of data. Cache memory subsystems 52 and 56 may be integrated within respective processor cores 50 and 54. Alternatively, cache memory subsystems 52 and 56 may be coupled to processor cores 52 and 56 in a backside cache configuration or an in-line configuration, as desired. Still further, cache memory subsystems 52 and 56 may be implemented as a hierarchy of caches. Caches which are nearer processor cores 50 and 54 (within the hierarchy) may be integrated into processor cores 50 and 54, if desired. In one embodiment, cache memory subsystems 52 and 56 each represent level two (L2) cache structures and cache memory subsystem 17A represents a level three (L3) cache structure.

Processor cores 50 and 54 generally include circuitry for executing instructions according to a predefined instruction set. For example, the x86 instruction set architecture may be selected. Alternatively, the Alpha, PowerPC, or any other instruction set architecture may be selected. Generally, the processor core 50 and 54 access the cache memory subsystems 52 and 56, respectively, for data and instructions. If a cache miss is detected in a cache (52, 56) and is also detected in the L3 cache 17A, a read request is generated and transmitted to the memory controller within the node to which the missing block is mapped. It is noted that the embodiment depicted in FIG. 1 is provided for purposes of discussion. Those skilled in the art will appreciate that the methods and mechanisms described herein are applicable to numerous alternative embodiments and configurations. For example, embodiments with more than two cores, or even a single core, are possible. All such alternatives are contemplated.

As noted above, in multi-programming environments, shared levels of cache may pose challenges. For example, multiple programs running on different cores (50, 54) may interact even though they are unrelated. Because they are unrelated, they may have different requirements for various resources, such as execution and memory resources. If one program is streaming through memory, it may needlessly displace data in the L3 cache 17A which is utilized by the other program. An example of streaming through memory may generally entail missing in the L3 cache 17A and allocating data therein, but not using the newly allocated data again. Consequently, this displacement may occur even though the program is gaining no (or relatively little) benefit from use of the L3 cache 17A. In such a case, the program which is displacing the data is interfering with operation of the other program and may be considered an "aggressive neighbor". Consequently, it may be desirable to detect such scenarios and maintain some type of control over resource utilization. For example, it may be desirable to detect and "block" such "aggressive neighbors" by reducing or eliminating the above described displacement of data.

In one embodiment, when a thread, process, etc., is determined to be at a certain interference level, its utilization of a shared resource is limited. For example, in the case of the shared L3 cache 17A, a thread's allocation of data into the shared cache may be increasingly limited. In one embodiment, a figure of merit (FOM) is determined for each thread (or process, task, program, etc.). Based upon the figure of merit, resource utilization by the thread may be affected. For example, assume the L3 cache 17A is a victim cache which is configured to store victims from the L2 caches (52, 56). Depending on the figure of merit for a given thread, data for the thread may be allocated in progressively lower classes of a cache replacement policy's replacement stack. For example, a common cache replacement policy is the least recently used (LRU) replacement policy in which least recently used items are discarded from the cache first. Such a policy requires keeping track of when a particular data item was used. Initially, when a data item is first allocated in the cache, it may be marked as most recently used (MRU). Typically, MRU data items in the cache will be selected last for replacement. As a particular data item in the cache ages without being used, its status may progress from MRU to LRU in one or more steps according to the particular implementation. Assuming such a policy, or other suitable policy, as a thread's interference gets worse, it may no longer allocate at a most recently used (higher) position, but may allocate at progressively lower positions. In this manner, the impact of more aggressive threads on better behaved threads may be reduced.

In one embodiment, two allocation positions of the replacement policy may be utilized depending on a relative figure of merit. More or other allocation positions may be used as well. Two possible allocation positions are as follows:
1) Allocate a new victim from a core's L2 cache in the replacement stack at the MRU/2 position.
2) Allocate a new victim from a core's L2 in the replacement stack at the LRU position.

In order to determine which allocation position will be used, a figure of merit is determined. In one embodiment, the figure of merit may generally represent the performance benefit a thread gets from utilizing a given level of cache. To make this determination, two factors or characteristics may be used—"utility" (U) and "desire" (D). Utility may generally represent how well a level of cache is being used (e.g. hit rate), and desire may represent how dependent a thread is on the performance of this level of the cache (e.g. access rate). Using these two factors, a figure of merit (FOM) may be computed as:

$$FOM=U*D$$

As noted above, allocation at two different levels (MRU/2, LRU) may be based on the relative FOM between threads. As an example, assume a scenario including a thread A, and a thread B. If thread A's FOM is >4× that of thread B's FOM, then thread B's misses may be forced to allocate at the MRU/2 position. If thread A's FOM is >16× thread B's, then thread B's misses may be forced to allocate at the LRU position. In this manner, the impact of a relatively poorly behaving thread B on thread A may be reduced.

In one embodiment, the desire (D) of a particular thread may be equal to the number of cache (e.g., L3 cache) accesses per clock. The utility (U) of a thread may be computed in a variety of ways. TABLE 1 below depicts one embodiment of how utility may be determined.

TABLE 1

| Hit Rate (Hits/accesses during interval) | Utility |
|---|---|
| Hit rate < 25% | 1 * L3 hits/access for this thread |
| 25% <= Hit Rate < 50% | 2 * L3 hits/access for this thread |
| 50% <= Hit Rate < 75% | 4 * L3 hits/access for this thread |
| 75% <= Hit Rate <= 100% | 1 * L3 hits/access for this thread |

In TABLE 1, the utility (column 2) for a given thread depends upon the hit rate (column 1) for the respective thread. For example, if the hit rate of a given thread is 18%, then the utility may be computed as being equal to the L3 hits/access of the thread. If the hit rate is 40%, then the utility may be set at 2*L3 hits/access. As can be seen from the table, the utility factor generally increases as the hit rate increases. In the embodiment of TABLE 1, a piecewise-linear function is used. Other types of functions, linear or non-linear, may be used in alternative embodiments as desired.

It is noted that the speedup of any given thread may not be linearly proportional to its hit rate. Rather, the speedup of a thread may be proportional to the percentage reduction in its miss rate, provided the hit rate is low and the access rate to the cache is high. Consequently, for low hit rates [0%, 25%) a multiplication factor of 1 is used for the utility, for hit rates of [25%, 50%) a multiplication factor of 2 is used for utility, and for hit rates of [50%, 75%) a multiplication factor of 4 is used. However, at high hit rates [75%, 100%], the multiplication factor shown in Table 1 returns to 1. The multiplication factor may roll off at high hit rates because above a certain hit rate, an application may no longer be memory bound. Consequently, further increasing its hit rate may impact its overall performance less. In one embodiment, factors of 2 and 4 may be chosen because they are easy for hardware to compute. However, other embodiments may utilize more and/or other multiplication factors than those depicted in TABLE 1.

In one embodiment, using the above TABLE 1, the FOM may be computed as a moving average. For example, an interval such as 50K cycles may be used for the computation. In such an embodiment, a history for the previous 50K cycle interval may be maintained while computing the hits and accesses for the current interval. When a new interval is reached, the old interval counts may be discarded, and the role of the current counter and previous interval counter interchanged. Using this technique, we count the number of hits and accesses for each thread and use them to compute the FOMs. Other embodiments could utilize a weighted moving average if desired. As there exists a possibility that data may be shared by multiple threads, one potential difficulty is distinguishing thread-specific hits from "shared" data hits. In one embodiment, as will be discussed in greater detail below, an indication may be maintained for each data item which indicates whether or not it is shared.

Figure 2:
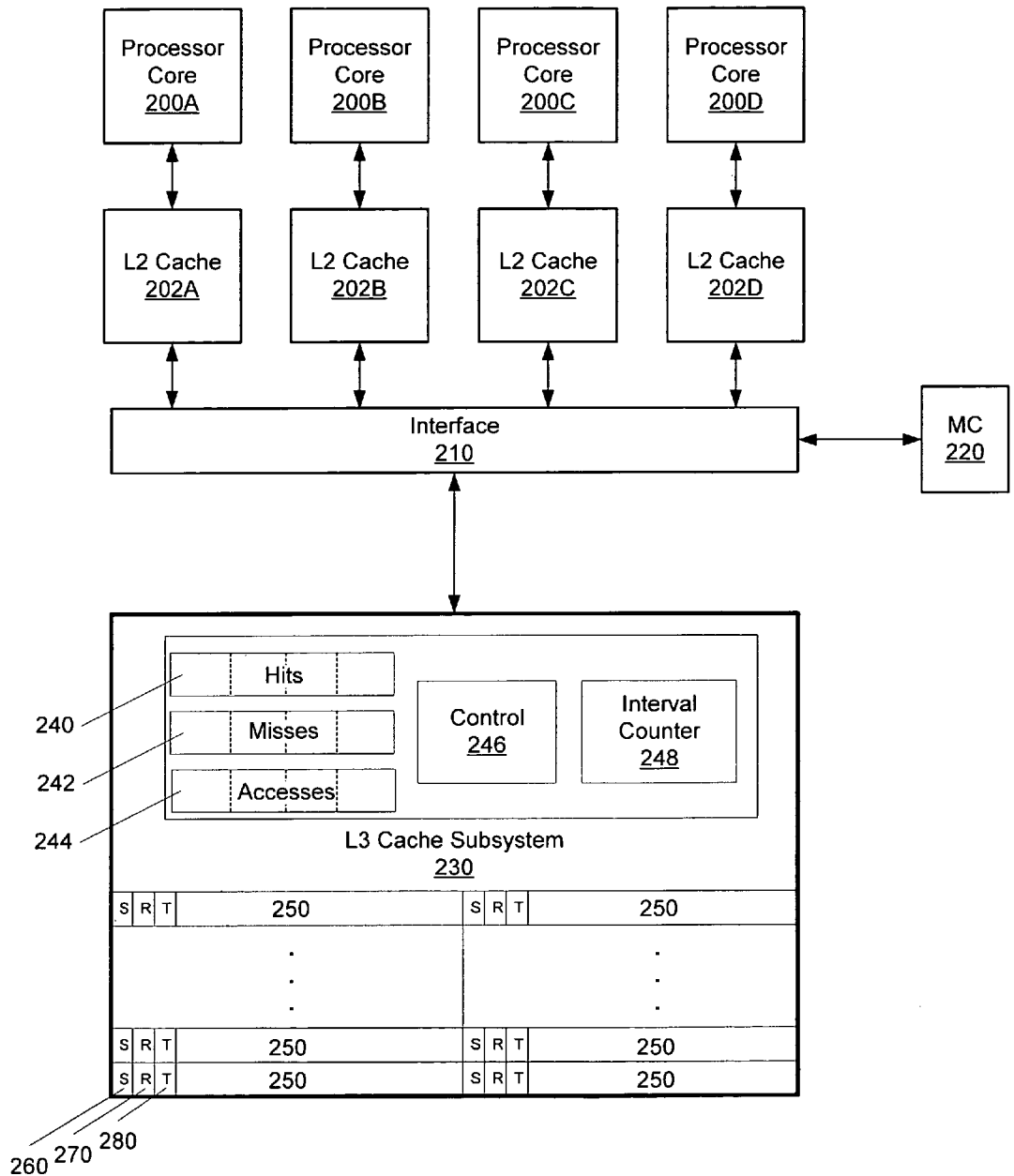
FIG. 2 is a block diagram of one embodiment of a processing system.
Figure 3:
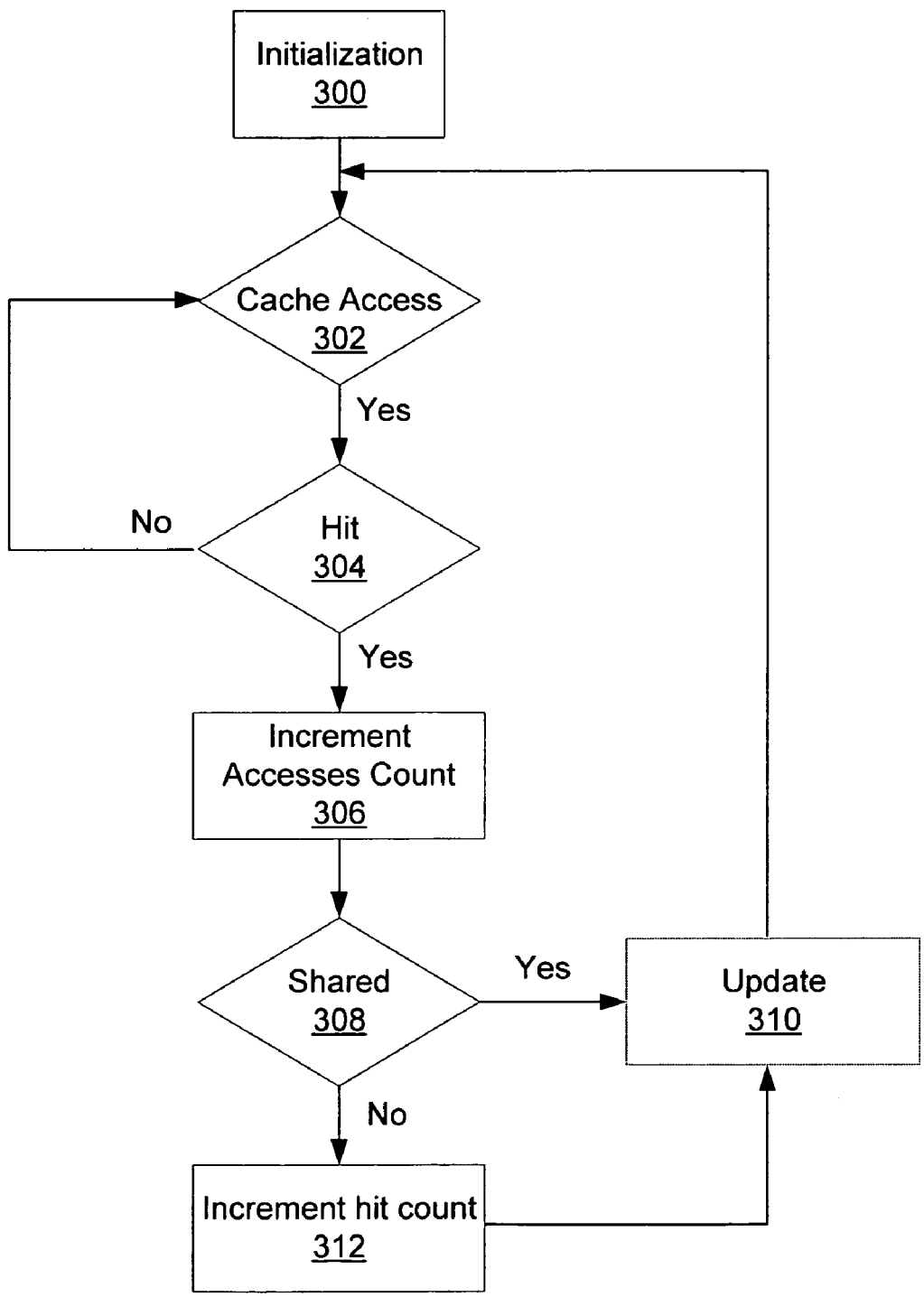
FIG. 3 depicts one embodiment of a method for managing cache accesses.

Turning now to FIG. 2, one embodiment of a system is shown which may be configured to control resource utilization by a given processing entity. As shown, the system includes processor cores 200A-200D, each coupled to a respective L2 cache 202A-202D. L2 caches 202A-202D may generally be coupled for exclusive use by the respective processor core 200A-220D. Elements referred to herein with a particular reference number followed by a letter may be collectively referred to by the reference number alone. For example, processor cores 200A-200D may be collectively referred to as nodes processor cores 200. Also shown in FIG. 2 is an L3 cache subsystem 230 which is coupled to each of the cores 200 and caches 202 via an interface 210. Interface 210 is also coupled to a memory controller (MC) 220. L3 cache subsystem 230 may be shared by processor cores 200. In one embodiment, L3 cache 230 is a victim cache configured to store victims evicted from L2 caches 202. Accordingly, in such an embodiment the L3 cache 230 and L2 caches 202 do not store duplicate information. In alternative embodiments, duplicate information may be maintained. In one embodiment, the system depicted in FIG. 2 is manufactured as a single chip.

In one embodiment, L3 cache 230 may comprise a two-way set associate cache. However, other embodiments may utilize alternative cache structures. In the example shown, L3 cache 230 includes multiple entries 250 for storing data. In addition, L3 cache subsystem 230 includes circuitry for use in supporting its operation. For example, a control unit 246 and interval counter 248 are depicted. Also, storage (e.g., registers or counters) may also be included for use in maintaining information regarding cache hits 240, cache misses 242, and cache accesses 244. In one embodiment, each of the storage entities 240, 242, and 244 may be configured to maintain separate counts for different processing entities. For example, separate counts may be maintained for different threads or processes. In one embodiment, a separate count is maintained for each of the processing cores 200A-200D. Therefore, a hit register 240 may maintain a count for each of the processing cores 200, a miss register 242 may maintain a separate miss count for each of the cores 200, and an access register may maintain a separate access count for each of the cores 200.

In one embodiment, hits 240, misses 242, and accesses 244 may be maintained on an interval basis. In other words, the counts are determined for a given interval of time (e.g., clock cycles). In such an embodiment, an interval counter 248 may be included which is incremented each cycle (or other predetermined period of time). When the interval counter indicates a particular interval has been reached, the count values stored within each of devices 240, 242, and 244 may be reset to zero. The particular interval chosen may be any suitable interval desired, and may be configurable. For example, control circuitry 246 may be operable to indicate an interval of 5000 is to be used. The interval counter 248 may then be reset to the value 5000 and decremented each clock cycle. When the interval counter reaches zero, the control circuitry 246 may detect this condition and reset the hit 240, miss 242, and access 244 counts.

In addition to the above, control circuitry 246 may also be configured to increment values stored in devices 240, 242, and 244. For example, on detecting an access to the L3 cache by one of the processor cores 200, control circuitry 246 may be configured to increment an access count 244 which corresponds to the accessing core 200. If the access hits in the L3 cache 230, control circuit 246 may increment a corresponding hit count 240. If the access misses in the L3 cache 230, the control circuit 246 may increment a corresponding miss count 242. It is noted that one or more of the hit 240, 242 miss, and access 244 counts may saturate or otherwise be capped at some predetermined value as desired.

Based upon one or more of the statistics represented by counts 240, 242, and 244, the control circuit 246 may determine a figure of merit for each of the processing entities represented. For example, in an embodiment wherein a separate value is maintained for each of the cores 200, control circuit 246 may determine a figure of merit for each of the cores 200. As noted above, count values may be maintained on an interval basis. Therefore, a figure of merit for each of the cores may represent a figure of merit for a corresponding core during a particular interval. In one embodiment, a figure of merit may be determined responsive to detecting allocations in the L3 cache 230. In other embodiments, determination of figures of merit may be performed on a more frequent basis.

As discussed above, in one embodiment a figure of merit may be determined based on factors denoted utility and desire. As noted, utility may generally represent how well a level of cache is being used, and desire may represent how dependent a thread is on the performance of this level of the cache. In one embodiment, desire may correspond to a number of accesses to the L3 cache 230 per clock. The utility for a given processing entity (e.g., processing core) may be based on a hit rate to the L3 cache 230. As illustrated in Table 1 above, the utility may be determined by a piece-wise linear function, or some other function. As depicted in Table 1, utility may simply be a hit rate multiplied by a particular factor. Ignoring for a moment the multiplication factor, it is noted that, in one embodiment, utility*desire=(hits/access)* (accesses/cycle) which reduces to hits/cycle. Therefore, when determining a figure of merit, control circuit 246 may modify a hit count by simply shifting the hit count 240 for a given processing entity depending upon the hit rate for that entity. In this manner, the hit count may be multiplied by a factor of two or four. The figure of merit may then be determined as hits/access.

In an embodiment wherein counts are being maintained on an interval basis, a figure of merit may represented by the (modified) hits/interval, rather than hits/access. As the counts are maintained on an interval basis, the modified hits/interval is simply the hit count 240 multiplied by a factor as appropriate. In this manner, no division is necessary to compute the figure of merit.

As is ordinarily the case, a replacement policy may be utilized for determining which of the data stored within the L3 cache 230 are replaced when necessary or otherwise desired. For example, L3 cache 230 may be configured to utilize a least recently used (LRU) replacement policy wherein least recently accessed data items are selected as candidates for replacement. As may be appreciated, such a replacement policy generally requires keeping track of when particular data items were accessed.

In one embodiment, "replacement" bits 270 may be maintained for each entry 250 to generally indicate when it was most recently accessed. The replacement bits could then be updated periodically and/or when a particular date item is accessed. For example, if a particular data entry 250 is accessed, the replacement bits for the entry could be updated to indicate it was most recently used (MRU). If a particular entry 250 is not accessed after a particular period of time, its corresponding replacement bits could be updated to indicate this fact (e.g., by downgrading its status from MRU to a lower status). It is noted that a status ranging from MRU to LRU may comprise any number of steps. In the simplest case, only the two conditions MRU and LRU are indicated and a single bit could be maintained. Alternatively, multiple bits may be maintained to indicate multiple statuses. For example, two bits could be used to indicate four statuses ranging from MRU ("11") to LRU ("00").

Typically, a replacement policy may operate by classifying a particular data item as MRU upon allocation in the cache. However, in one embodiment, a different approach may be used in the L3 cache subsystem 230. In one embodiment, when allocating data in the L3 cache 230, the replacement bits 270 for the data being placed in the cache 230 are not necessarily indicated to be MRU. Rather, the replacement bits for the allocated data may be determined based upon a figure of merit for the processing entity which causes the allocation. Generally speaking, a processing entity (e.g., core or thread) which is behaving poorly relative to other processing entities may have its data allocated at a lower replacement policy status. For example, rather than allocating at MRU, the data may be allocated at MRU/2, or some other level. In this manner, the allocated data is likely to be replaced earlier than would otherwise be the case.

In one embodiment, when data is allocated in the L3 cache 230, control unit 246 determines a figure of merit for the corresponding processing core 200 and compares that figure of merit to the figures of merit of the other processing cores. Depending upon how it compares to the figures of merit of the other processing cores, the data is allocated at one of a plurality of levels within the replacement policy (e.g., somewhere within the MRU to LRU range). For example, in one embodiment, the FOM of the core corresponding to the newly allocated data is compared to the average of the other cores' FOMs. Alternatively, it may be compared to the average FOM of all of the cores. In either case, if the FOM of the core compares unfavorably to the FOM of the other cores, the data being allocated may be allocated at a lower level in the replacement "stack."

Using the above described approach, if the average FOM of the other (or all) cores is at least 16 times that of the core whose data is being allocated, the data is allocated in the L3 cache 230 as LRU. If the average FOM is between 16 times and 4 times the FOM of that of the core whose data is being allocated, the data is allocated as MRU/2. If the average FOM of the cores is less than 4 times that of the core whose data is being allocated, then the data is allocated as MRU. In this manner, cores with "poor" L3 cache 230 behavior receive less favorable treatment with respect to L3 cache 230 allocation. Consequently, a poorly behaving processing entity (e.g., core) may have its utilization of the resource (L3 cache 230) reduced—thereby reducing its impact on the other cores 200.

In some cases it may be desired to distinguish between data in the L3 cache 230 which is shared and non-shared. By making such a distinction, it may be possible to more clearly compare the behavior of individual processing entities. In one embodiment, each data item 250 stored in the cache 230 may also have associated shared (S) bits 260 and thread (T) bits 280. When a data item 250 is allocated in the cache 230, an identification of the thread or core 200 allocating the data is included in the T bits 280. In addition, the shared (S) bit 260 is set to indicate the data item 250 is not shared. When an access is made to a data item 250 in the cache 230, the thread bits 280 of the data item 250 are compared to the processing entity making the access. If they are different, then a different processing entity is accessing the data item and the S bit 260 of the data item is changed to indicate it is shared. In addition, when a processing entity 200 accesses the L3 cache 230, the S bit 260 is checked. If the S bit 260 indicates the data item 250 is shared, then the hit is not counted and the corresponding hit count 240 of the processing entity is not incremented.

Figure 4:
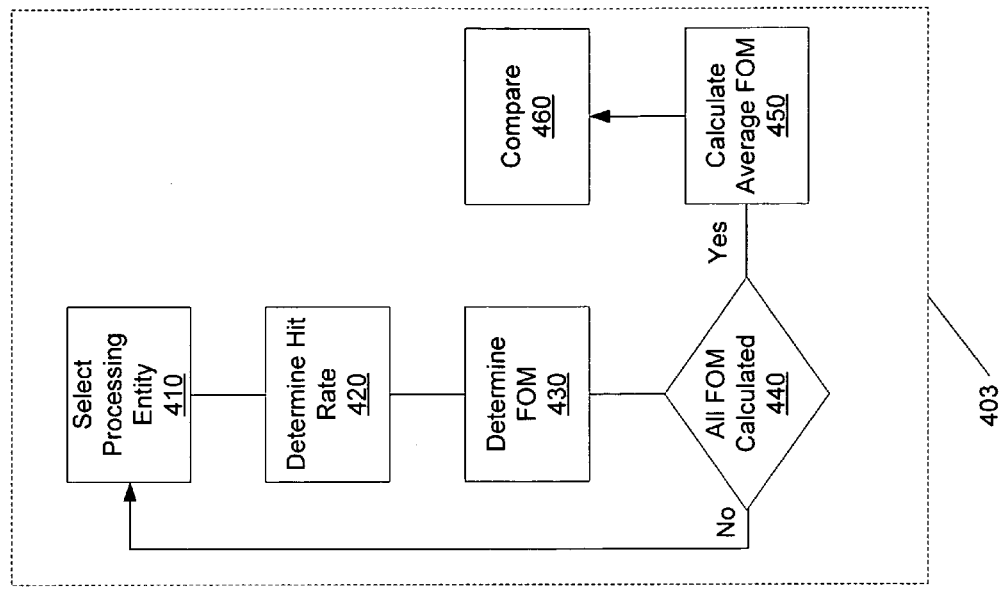
FIG. 4 depicts one embodiment of a method for managing cache figure of merit determinations.
Figure 4:
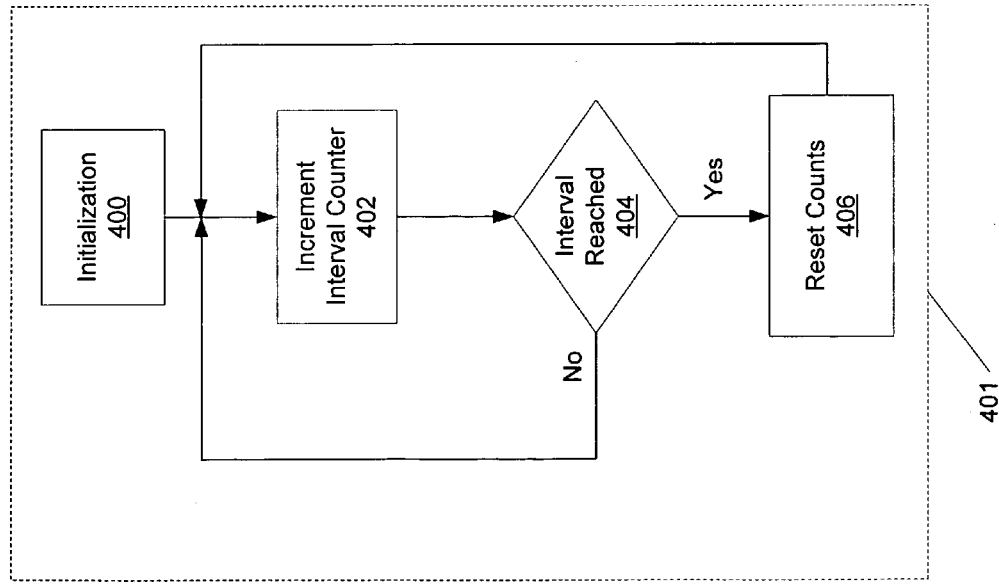

Turning now to FIG. 4, a method corresponding to a portion of the above described mechanism is shown. An initialization procedure (block 300) may first be performed which resets hit, miss, and access counts. In addition, an interval count for the interval counter 248 may be established as well. During operation of the shared cache 230, a cache access (decision block 302) may be detected. If the cache access hits (decision block 304), an access count for the accessing entity (e.g., core or thread) is incremented (block 306). In an embodiment as discussed above which tracks whether data is shared, if the hit is to shared data (decision block 308), then a figure of merit for the accessing entity may be updated (block 310). If the access is not to a shared data item, then, the corresponding hit count for the accessing entity is updated (block 312) and the corresponding figure of merit may be updated (block 310). It is noted that the updating of a figure of merit as shown in block 310 may be performed at different times in different embodiments. For example, as discussed above, determination of a figure of merit may be performed responsive to an allocation into the shared cache. Numerous such alternatives are possible and are contemplated.

FIG. 4 illustrates one embodiment of a method for determining an interval and figure of merit. Generally speaking, the methods 401 and 403 shown in FIG. 4 may occur concurrently. Block 401 depicts an initialization (block 400) which may include setting an interval counter. The interval counter may then be incremented (block 402) or decremented depending upon the implementation, and then a determination made as to whether a predetermined interval has been reached (decision block 404). If the interval has not been reached, incrementation may continue. If the interval has been reached, then hit, miss, and access counts may be reset as in the discussion above. In addition, the interval counter itself may be reset.

Block 403 depicts one embodiment of a method for determining and comparing figures of merit for processing entities. As shown in the example, a processing entity may be selected (block 410) for FOM determination. The hit rate for the entity may then be accessed/determined (block 420), and based on this value the figure of merit for the processing entity determined (block 430). As discussed above, determination of the figure of merit may include separately calculating desire and utility factors, and multiplying the two. Alternatively, the number of hits for a given interval may simply be multiplied by a particular factor depending upon the hit rate of the processing entity. If figures of merit have been determined for all of the processing entities (decision block 440), then an average of two or more of the FOMs may be determined (block 450). Subsequently, a comparison between the average and any given FOM may be made (block 460). In this manner, the behavior of the processing entities may be compared to one another.

Figure 5:
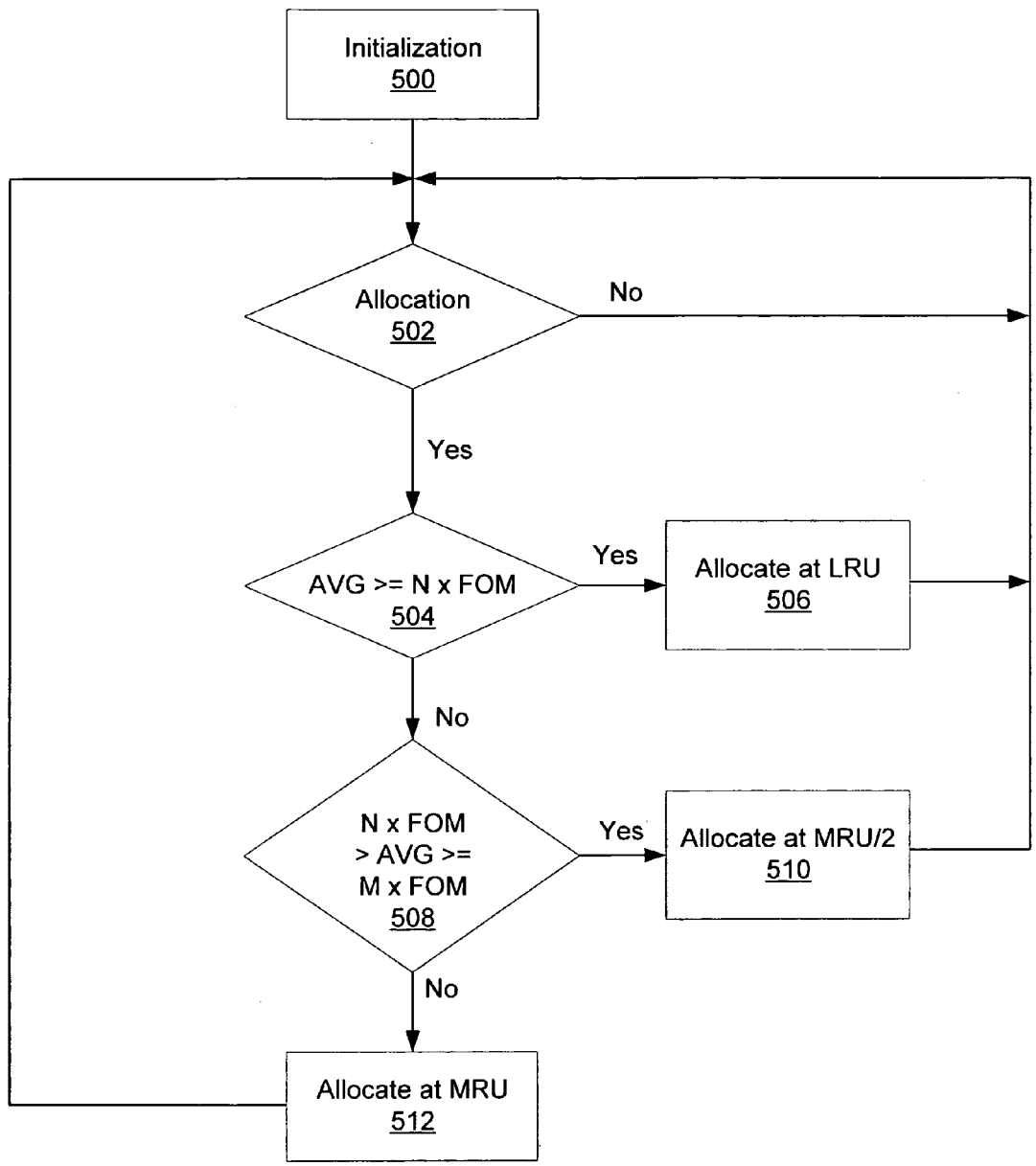
FIG. 5 depicts one embodiment of a method for cache allocations.

FIG. 5 depicts one embodiment of an allocation procedure for a shared cache. As before, an initialization procedure (block 500) may be performed which initializes values such as cache tags, cache entry bits, and so on. During operation, an allocation into the shared cache may be detected (decision block 502). If (decision block 504) the average figure of merit for the other (or all) processing entities is greater than or equal to a multiple N (e.g., 16) of the figure of merit for the processing entity which corresponds to the data, then the data is allocated in the cache at a least recently used place in the replacement stack. For example, the data item's replacement bits are set to indicate LRU. If (decision block 508) the average figure of merit for the other (or all) processing entities is less than N (e.g., 4)×FOM, but greater than or equal to a multiple M×FOM, then the data may be allocated at a different level in the replacement stack (e.g., MRU/2). Finally, if neither of the conditions indicated by blocks 504 or 508 are true, then the data may be allocated at as MRU (block 512). Of course, those skilled in the art will appreciate that more and other values may be used for comparison in the method of FIG. 5.

Figure 6:
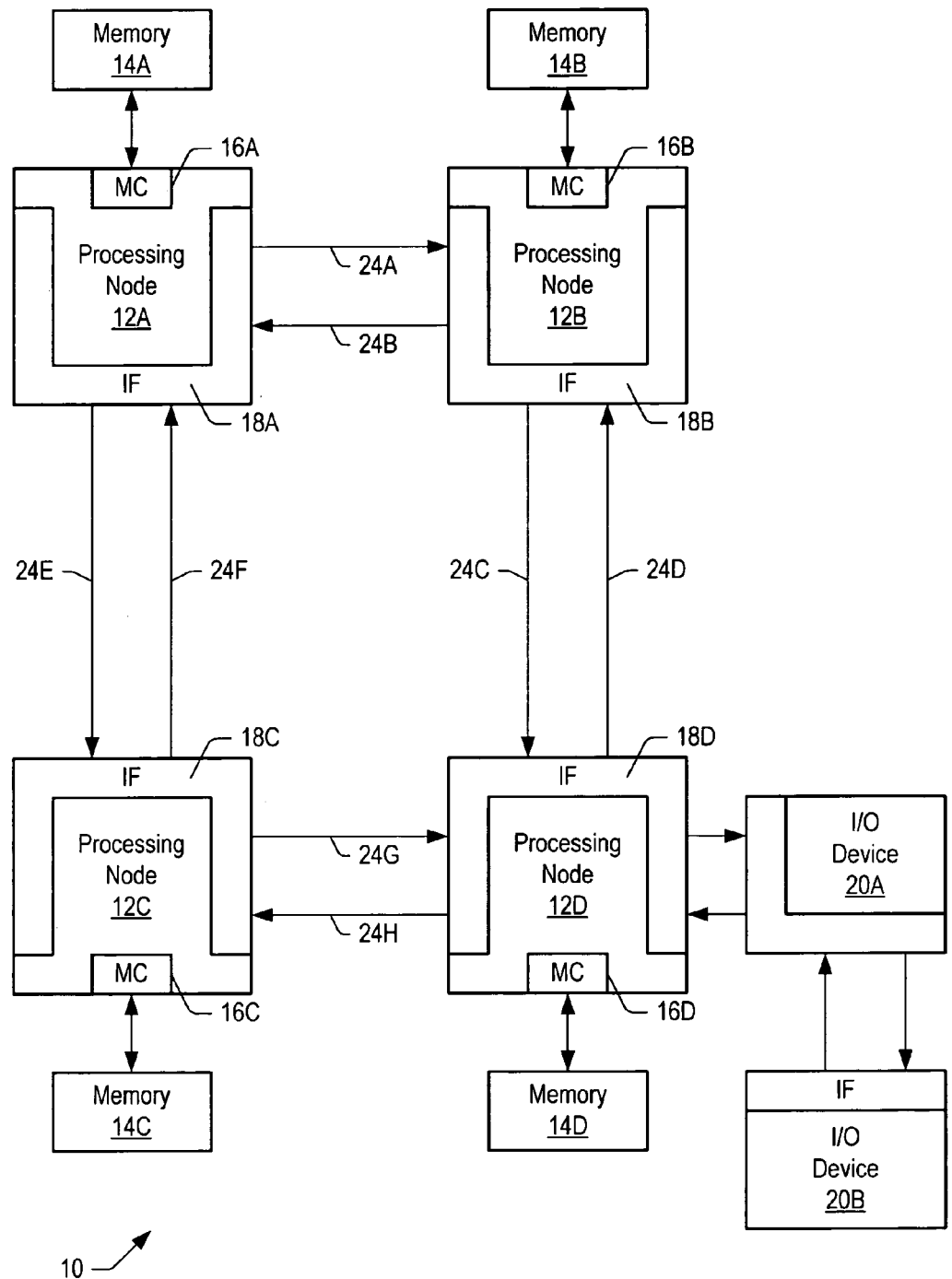
FIG. 6 is a block diagram of one embodiment of a computing system.

FIG. 6 depicts one embodiment of a computer system 10 which may incorporate the methods and mechanisms described above. Computer system 10 includes a plurality of processing nodes 12A, 12B, 12C, and 12D. Each processing node is coupled to a respective memory 14A-14D via a respective memory controller 16A-16D. Additionally, each processing node 12A-12D includes interface logic 18A-18D used to communicate with others of the processing nodes 12A-12D. For example, processing node 12A includes interface logic 18A for communicating with processing nodes 12B and 12C. Similarly, processing node 12B includes interface logic 18B for communicating with processing nodes 12A and 12D, and so on. In the embodiment of FIG. 6, processing node 12D is shown coupled to communicate with an input/output (I/O) device 20A via interface logic 18D, and I/O device 20A is further coupled to a second I/O device 20B. Other processing nodes may communicate with other I/O devices in a similar fashion. Alternatively, a processing node may communicate with an I/O bridge which is coupled to an I/O bus.

Computer system 10 may implement a packet-based link for inter-node communication. In the depicted embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C-24H are used to transmit packets between other processing nodes as illustrated in FIG. 6. The link may be operated in a cache coherent fashion for communication between processing nodes or in a non-coherent fashion as a daisy-chain structure between I/O devices 20A-20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 6. Any suitable routing algorithm may be used. Other embodiments of computer system 10 may include more or fewer processing nodes than the embodiment shown in FIG. 6. In addition, other embodiments are possible in which each processing node is coupled to every other processing node through a point-to-point network.

In addition to the depicted memory controller and interface logic, each processing node 12A-12D may include one or more processors and associated caches, as described further below. Broadly speaking, a processing node comprises at least one processor and may optionally include a memory controller for communicating with a memory and other logic, as desired. It is noted that the terms "processing node" and "processor node" may be used interchangeably herein.

Memories 14A-14D may comprise any suitable memory devices. For example, a memory 14A-14D may comprise one or more RAMBUS DRAMs (RDRAMs), synchronous DRAMs (SDRAMs), DRAM, static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address should be routed. The particular processing node associated with a given memory address may be referred to herein as the home node of that address. In one embodiment, the coherency point for an address within computer system 10 is the memory controller 16A-16D coupled to the memory storing bytes corresponding to the address. Memory controllers 16A-16D may comprise control circuitry for interfacing to memories 14A-14D. Additionally, memory controllers 16A-16D may include request queues for queuing memory requests.

Generally, interface logic 18A-18D may comprise buffers for receiving packets from the link and for buffering packets to be transmitted upon the link. Computer system 10 may employ any suitable link level flow control mechanism for transmitting packets reliably. Communications between processing nodes 12A-12D of computer system 10 may be accommodated using various specific packet-based messaging, as desired.

I/O devices 20A-20B are illustrative of any desired peripheral devices. For example, I/O devices 20A-20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A system comprising:
a plurality of processing entities operable to process data;
a cache shared by the plurality of processing entities; and
circuitry configured to manage allocations of data into the cache, wherein the circuitry is configured to:

detect an allocation of data into the cache, wherein said allocation corresponds to a given processing entity of the plurality of processing entities;

allocate the data in the cache at a first level of a replacement stack, in response to determining a figure of merit of the given processing entity meets a first condition; and allocate the data in the cache at a second level of the replacement stack which is different from the first level, in response to determining the figure of merit meets a second condition;

wherein the circuitry is further configured to compare the figure of merit to an average figure of merit for two or more of the plurality of processing entities.

2. The system as recited in claim 1, wherein the figure of merit is based upon at least a hit rate of the given processing entity to the cache.

3. The system as recited in claim 2, wherein the first condition comprises the figure of merit is less than a predetermined fraction of said average figure of merit.

4. The system as recited in claim 3, wherein the second condition comprises the figure of merit is greater than said predetermined fraction.

5. The system as recited in claim 1, wherein the circuitry is further configured to maintain for each of the processing entities: a hit count; a miss count and an access count.

6. The system as recited in claim 5, wherein said figure of merit comprises a product of a measure of utility and a measure of desire for the given processing entity, wherein said measure of desire corresponds to a number of cache accesses by the given processing entity and said measure of utility is related to a hit rate by the given processing entity to the cache.

7. The system as recited in claim 5, wherein the circuitry is further configured to maintain a shared indication for each data item stored in the cache, and wherein the circuitry is configured to increment a hit count for a corresponding processing entity only if an access of the corresponding processing entity to the cache hits on data which is not shared.

8. The system as recited in claim 7, wherein the circuitry is further configured to maintain an indication as to which processing entity of the plurality of processing entities caused an initial allocation of data into the cache, and wherein the circuitry detects a particular data item is shared by determining a hit to a data item stored in the cache corresponds to a processing entity other than a processing entity which caused an allocation of the data item.

9. The system as recited in claim 1, wherein each of the plurality of processing entities comprises a processor core.

10. The system as recited in claim 9, wherein the system further comprises a plurality of exclusive caches corresponding to each processor core, and wherein the cache which is shared by the plurality of processing cores comprises a victim cache.

11. A method for managing cache allocations comprising:
detecting an allocation of data into the cache, wherein said allocation corresponds to a given processing entity of a plurality of processing entities operable to process data;

allocating the data in the cache at a first level of a replacement stack, in response to determining a figure of merit of the given processing entity meets a first condition;

allocating the data in the cache at a second level of the replacement stack which is different from the first level, in response to determining the figure of merit meets a second condition; and comparing the figure of merit to an average figure of merit for two or more of the plurality of processing entities.

12. The method as recited in claim 11, wherein the figure of merit is based upon at least a hit rate of the given processing entity to the cache.

13. The method as recited in claim 12, further comprising wherein the first condition comprises the figure of merit is less than a predetermined fraction of said average figure of merit.

14. The method as recited in claim 13, wherein the second condition comprises the figure of merit is greater than said predetermined fraction.

15. The method as recited in claim 11, further comprising maintaining for each of the processing entities: a hit count; a miss count, and an access count.

16. The method as recited in claim 15, wherein said figure of merit comprises a product of a measure of utility and a measure of desire for the given processing entity wherein said measure of desire corresponds to a number of cache accesses by the given processing entity and said measure of utility is related to a hit rate by the given processing entity to the cache.

17. The method as recited in claim 15, further comprising maintaining a shared indication for each data item stored in the cache, and incrementing a hit count for a corresponding processing entity only if an access of the corresponding processing entity to the cache hits on data which is not shared.

18. The method as recited in claim 17, further comprising maintaining an indication as to which processing entity of the plurality of processing entities caused an initial allocation of data into the cache, and detecting a particular data item is shared by determining a hit to a data item stored in the cache corresponds to a processing entity other than a processing entity which caused an allocation of the data item.

19. The method as recited in claim 11, wherein each of the plurality of processing entities comprises a processor core.

20. A cache subsystem comprising:
a cache comprising a plurality of entries; and
circuitry configured to manage allocations of data into the cache, wherein the circuitry is configured to:
detect an allocation of data into the cache, wherein said allocation corresponds to a given processing entity of a plurality of processing entities operable to process data;
allocate the data in the cache at a first level of a replacement stack, in response to determining a figure of merit of the given processing entity meets a first condition; and
allocate the data in the cache at a second level of the replacement stack which is different from the first level, in response to determining the figure of merit meets a second conditions
wherein the circuitry is further configured to compare the figure of merit to an average figure of merit for two or more of a plurality of processing entities.

21. The cache subsystem of claim 20, wherein the circuitry is further configured to maintain for each of the processing entities: a hit count, a miss count, and an access count.

* * * * *